US011631102B2

(12) United States Patent
Le et al.

(10) Patent No.: US 11,631,102 B2
(45) Date of Patent: Apr. 18, 2023

(54) OPTIMIZATION OF MARKDOWN SCHEDULES FOR CLEARANCE ITEMS AT PHYSICAL RETAIL STORES

(71) Applicant: Target Brands, Inc., Minneapolis, MN (US)

(72) Inventors: Luyen Le, Minneapolis, MN (US); Saibal Bhattacharya, San Mateo, CA (US)

(73) Assignee: Target Brands, Inc., Minneapolis, MN (US)

( * ) Notice: Subject to any disclaimer, the term of this patent is extended or adjusted under 35 U.S.C. 154(b) by 130 days.

(21) Appl. No.: 16/835,917

(22) Filed: Mar. 31, 2020

(65) Prior Publication Data
US 2021/0304243 A1    Sep. 30, 2021

(51) Int. Cl.
| | |
|---|---|
| G06Q 30/02 | (2012.01) |
| G06Q 10/04 | (2012.01) |
| G06Q 10/06 | (2012.01) |
| G06Q 10/08 | (2012.01) |
| G06Q 30/0235 | (2023.01) |
| G06Q 10/067 | (2023.01) |

(Continued)

(52) U.S. Cl.
CPC ........ G06Q 30/0235 (2013.01); G06Q 10/04 (2013.01); G06Q 10/067 (2013.01); G06Q 10/087 (2013.01); G06Q 30/0205 (2013.01); G06Q 30/0206 (2013.01); G06Q 30/0223 (2013.01); *G06N 20/00* (2019.01)

(58) Field of Classification Search
CPC .. G06Q 30/0235; G06Q 10/04; G06Q 10/067; G06Q 10/087; G06Q 30/0205; G06Q 30/0206; G06Q 30/0223; G06N 20/00

USPC ............................................ 705/7.35, 14.35
See application file for complete search history.

(56) References Cited

U.S. PATENT DOCUMENTS

| 7,379,890 B2 | 5/2008 | Myr et al. |
| 7,424,440 B1 | 9/2008 | Gupta et al. |

(Continued)

OTHER PUBLICATIONS

Borrasé, Rodolfo Carboni, Clearance Pricing Optimization at Zara, B.S. 2004, Electrical Engineering, University of Costa Rica, Massachusetts Institute of Technology, Jun. 2009; 121 Pages.

(Continued)

*Primary Examiner* — Charles Guiliano
(74) *Attorney, Agent, or Firm* — Merchant & Could P.C.

(57) ABSTRACT

Methods and systems are described for optimizing markdown schedules for clearance items at physical retail stores. For example, price sensitivity of a current inventory item at a physical retail store may be modeled using techniques that account for differences in operating behavior and data availability at physical stores versus online channels for selling items. When the current item is placed on clearance at the physical retail store, a request for a markdown schedule, including goals for the clearance, may be received. The forecasted price sensitivity of the current item may be adjusted based on actual price sensitivity of one or more past clearance items (e.g., based on actual clearance sales data) determined to match the current item. An optimal markdown schedule for the item may then be determined based, at least in part, on the adjusted price sensitivity of the item and clearance goals.

21 Claims, 9 Drawing Sheets

(51) Int. Cl.
*G06Q 30/0207* (2023.01)
*G06Q 30/0201* (2023.01)
*G06Q 30/0204* (2023.01)
*G06Q 10/087* (2023.01)
*G06N 20/00* (2019.01)

(56) References Cited

U.S. PATENT DOCUMENTS

| | | |
|---|---|---|
| 7,912,748 B1 * | 3/2011 | Rosenberg ........... G06Q 10/087 |
| | | 705/7.35 |
| 7,921,061 B2 | 4/2011 | Rangarajan et al. |
| 7,979,299 B1 * | 7/2011 | Mehta ................ G06Q 30/0201 |
| | | 705/7.29 |
| 8,000,996 B1 | 8/2011 | Sanli et al. |
| 8,639,558 B2 | 1/2014 | Desai et al. |
| 2005/0096963 A1 | 5/2005 | Myr et al. |
| 2008/0077459 A1 | 3/2008 | Desai et al. |
| 2009/0327037 A1 | 12/2009 | Ng et al. |
| 2015/0120394 A1 | 4/2015 | Bhattacharya et al. |
| 2017/0116631 A1 * | 4/2017 | Sarin .................. G06Q 30/0205 |
| 2017/0200180 A1 | 7/2017 | Kannan et al. |
| 2019/0244233 A1 * | 8/2019 | Kang ..................... G06Q 30/06 |
| 2021/0241351 A1 * | 8/2021 | Francis .............. G06Q 30/0631 |

OTHER PUBLICATIONS

Caro et al., Clearance Pricing Optimization for a Fast-Fashion Retailer, Operations Research 60(6), INFORMS 2012; pp. 1404-1422.

* cited by examiner

OPTIMIZATION OF MARKDOWN SCHEDULES FOR CLEARANCE ITEMS AT PHYSICAL RETAIL STORES

BACKGROUND

Many retailers have both physical and online channels for selling inventory items. Clearance is a final sale mechanism used in both channels to reduce or eliminate remaining units of an inventory item. A markdown schedule for an inventory item being placed on clearance may include a set of price discounts and associated durations for the price discounts throughout the clearance. A price sensitivity of the inventory item may be informative in determining an optimal set of the price discounts and associated durations thereof in order to maximize revenue while minimizing the inventory.

While the goal of clearance in a physical store is the same as online, there are significant differences in the operating behavior and data availability associated with a physical store. Thus, different and more complex techniques for modeling the price sensitivity for the inventory item at the physical store are required. It is with respect to these and other general considerations that embodiments have been described.

SUMMARY

In accordance with the present disclosure, the above and other issues are addressed by the following:

In a first aspect, example methods for optimizing an inventory item markdown schedule are described. In an example method, a first model may be built to represent a forecasted price sensitivity of a current inventory item at a physical store of a retailer. A request may be received for a markdown schedule when the current inventory item is to be placed on clearance at the physical store. A set of potential markdown schedules may be generated based on parameters of the request, each potential markdown schedule of the set defining one or more discounts and an associated discount duration. A past clearance item may be matched to the current inventory item, and a second model that represents an actual price sensitivity of the past clearance item may be applied to the first model to adjust the forecasted price sensitivity of the current inventory item. An optimal markdown schedule may be determined from among the set of potential markdown schedules based on the adjusted price sensitivity of the current inventory item.

In a second aspect, example systems for optimizing an inventory item markdown schedule are described. An example system may include a processor, and a memory communicatively coupled to the processor. The memory may store instructions that, when executed by the processor, cause the system to build a first model that represents a forecasted price sensitivity of a current inventory item at a physical store of a retailer, receive a request for a markdown schedule when the current inventory item is to be placed on clearance at the physical store, and generate a set of potential markdown schedules based on parameters of the request, each potential markdown schedule of the set defining one or more discounts and an associated discount duration. Additionally, the system may be caused to match a past clearance item to the current inventory item, and apply a second model that represents an actual price sensitivity of the past clearance item to the first model to adjust the forecasted price sensitivity of the current inventory item, and determine an optimal markdown schedule from among the set of potential markdown schedules based on the adjusted clearance price sensitivity of the current inventory item.

In a third aspect, example non-transitory computer-readable media with instructions stored thereon for optimizing an inventory item markdown schedule are described. The instructions may include building a first model that represents a forecasted price sensitivity of a current inventory item at a physical store of a retailer, receiving a request for a markdown schedule when the current inventory item is to be placed on clearance at the physical store, and generating a set of potential markdown schedules based on parameters of the request, each potential markdown schedule of the set defining one or more discounts and an associated discount duration. The instructions may further include identifying a past clearance item that matches the current inventory item, and applying a second model that represents the actual price sensitivity of the past clearance item to the first model to adjust the forecasted price sensitivity of the current inventory item, and determining an optimal markdown schedule from among the set of potential markdown schedules based on the adjusted price sensitivity of the current inventory item.

BRIEF DESCRIPTION OF THE DRAWINGS

Non-limiting and non-exhaustive examples are described with reference to the following figures.

DETAILED DESCRIPTION

Figure 1:
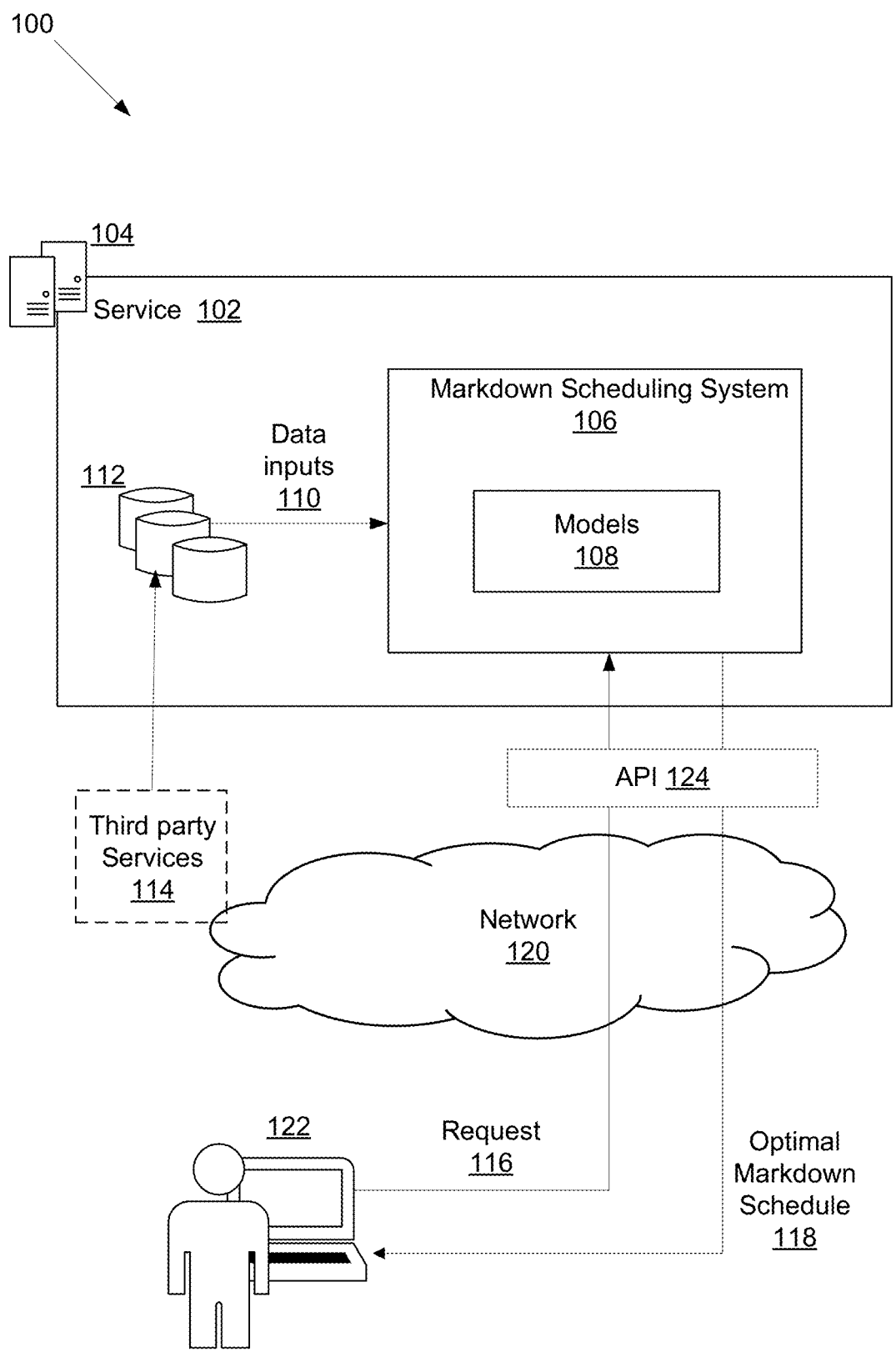
FIG. 1 illustrates an example network environment where a system for optimizing markdown schedules for inventory items at physical retail stores may be implemented.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, embodiments of the present invention are directed to optimization of markdown schedules for clearance items at physical stores of a retailer. Many retailers have both physical and online channels for selling inventory items. Clearance is a final sale mechanism used in both channels to maximize revenue while reducing or eliminating remaining units of inventory. A purpose of clearance optimization is to determine an optimal set of price discounts and associated durations thereof that will maximize revenue given different goals and different constraints for the clearance program. The optimal set of prices or discounts may be determined based on a price sensitivity of the inventory item that captures the relationship between price and demand for the inventory item. While the goal of clearance in a physical store is the same as online, there are significant differences in the operating behavior and data availability associated with physical stores that requires different and more complex techniques for modeling the price sensitivity for the inventory item at a physical store.

For example, with regard to operating behavior, changing prices of the inventory item in physical stores is much more labor intensive than changing prices of the inventory item online. The process requires new stickers to indicate the new prices, and may require new signage to indicate that the inventory item is on clearance. Furthermore, the inventory item may be moved from its current location to a different location within the physical store to make room for newer inventory items or to increase its visibility. There may also be a lag time from the time the inventory item is intended to be on clearance and when the clearance discount prices are shown to consumers, due to the time and labor required to change prices within the physical store, for example. Thus, when modeling price sensitivity of an inventory item at a physical store, factors associated with signage, location in the store, and timing of clearance must also be considered.

Additionally, unlike in the online channel, inventory (e.g., units of the inventory item) must exist at a physical store in order for the item to be purchased at the physical store, where a positive relationship often exists between sales and available inventory. Consequently, it is important to stock a physical store with sufficient inventory to fulfill consumer demand, but too much inventory will take away shelf space from other potentially better selling items. Therefore, accurately predicting demand at an individual store level is important for clearance optimization, particularly because inventory is often pushed to a physical store prior to the start of clearance.

With regard to data availability, in order to determine the set of optimal price discounts and associated durations thereof within a markdown schedule, a relationship between price and demand for the inventory item may be captured. For example, a price sensitivity measured by price elasticity of demand may be determined. Demand may be defined as a consumer's propensity to buy the inventory item. Demand is distinct from sales which captures the number of units of the inventory item successfully sold. Within the online channel, demand may be directly captured using order or purchase data because when a customer places an order, it indicates that the customer wanted to buy the product, even if the retailer is unable to fulfill the request. In some examples, within the online channel, consumers' views and clicks may also be utilized as signals for demand. Additionally, within the online channel, price changes to an inventory item may be recorded immediately, enabling accurate correlation of consumer demand with price.

In contrast with the online channel, physical stores are limited to capturing sales as a proxy for demand. Additionally, some of the operating differences discussed above inhibit accurate measurement of consumers' response to price. For example, because there may be a lag time from when prices are sent to the store to when the prices are communicated to the consumers via stickers or signs, for example, it may be difficult to accurately correlate consumer demand with price. To provide an example scenario, a physical store may receive instructions to change the price for a pair of gloves from $12.99 to $9.99 on Sunday. Due to labor workload, the price may be changed to $9.99 anytime between Tuesday and Thursday. If the gloves do not sell on Wednesday, there is uncertainty as to whether the gloves did not sell at $9.99 because consumers found the product to be lacking in value even despite the price decrease or because on Wednesday the price was still stickered at $12.99. Thus, an accurate measurement of consumer response to the price may not be obtainable as there is a lack of visibility as to when the price change actually occurred.

Moreover, when modeling price sensitivity within the online channel, the online channel is treated as one large store having substantial data for modeling. In contrast, for physical stores, price sensitivity for the inventory item may be specific to each physical store and thus is modeled accordingly. However, there is limited price and demand data associated with each physical store, and thus different statistical techniques than those used for the online channel are required for modeling price sensitivity due to data sparsity. Additionally, there may be tens, hundreds, or thousands of physical stores, each of which may have a different demand for the item on clearance. This drastically increases data processing requirements in order to model anticipated sales of each inventory item at each physical store in the context of a clearance program.

Embodiments described herein provide methods and systems that account for the above-described differences to model price sensitivity of an inventory item at a physical retail store. For example, the system may employ statistical techniques for the modeling that are suitable for low volumes of data, as well as additional data cleansing to account for the data sparsity. Additionally, the system may employ techniques to enhance the quality of data and enhance a signal between price and demand to improve accuracy of the predicted price sensitivity. The model may then be applied to facilitate forecasting or prediction of an optimal markdown schedule for the inventory item when it is to be placed on clearance at the physical retail store.

In summary, although a process for determining a clearance schedule for an individual store may be performed on an ad-hoc basis at that store, formulating an optimized store clearance schedule that accounts for current inventory levels across a large retail enterprise is significantly more complex, since each store location will have different price elasticity, different demand, different inventory, and different operating behavior as compared to other individual, physical stores. Additionally, treating store clearance the same as clearance of items online leads to a great deal of inefficiency because online clearance does not account for costs to implement, among other factors, physical repricing and repositioning activities. Therefore, existing systems may be inefficient in that they (1) allow individualized stores to implement clearance programs without considering objective sales data available from other stores and/or similar items, or (2) apply a common clearance schedule across all or some subset of stores without regard to the differences between each physical store location. The present methods and systems implement a significantly more complex, customized, and coordinated clearance program for an enterprise across some or all of its store locations based on information about other stores and/or locations.

FIG. 1 illustrates an example network environment 100 where a system 106 for optimizing markdown schedules for inventory items at physical retail stores may be implemented. The system 106 may be a markdown scheduling system hosted by a service 102. In some examples, the service 102 may be associated with a retailer. The retailer may have at least one or more physical stores through which a plurality of inventory items are sold. The retailer may also have an online store in addition to the physical stores. One or more servers or processors 104 may be operable to execute one or more components of the service 102, including the system 106.

As described in greater detail with reference to FIGS. 2-4 below, the system 106 may build and train models 108 that can then be applied to facilitate forecasting or prediction of optimal markdown schedules for inventory items being placed on clearance at the physical stores of the retailer. The models 108 may be built and trained using data inputs 110 received from one or more data stores 112 of the service 102. In some examples, the models 108 may be built for each current inventory item of the retailer on a per-store basis. Each of the models 108 may represent a forecasted price sensitivity of the respective current inventory item at the respective physical store prior to the current inventory item being placed on clearance. To account for the unique differences in operating behavior and data availability associated with physical retail stores versus online channels, statistical techniques suitable for lower volumes of data and processes for enhancing signals between price and demand, as well as additional data cleansing processes may be employed to build the models 108, as described in greater detail with respect to FIG. 3 below. The models 108 may be stored in association with the respective inventory items and the physical stores to facilitate retrieval and application of the models 108 when forecasting the optimal markdown schedules. In some examples, the models may be stored internally within a database of the system 106 or service 102. In other examples, the models may be stored externally in a database hosted by a third party storage server or system, for example.

In response to the system 106 receiving a request 116 for a markdown schedule for a current inventory item that is being placed on clearance at one or more physical retail stores, an optimal markdown schedule 118 may be determined for the clearance item at each of the one or more physical retail stores. For example, the request may indicate the current inventory item is being placed on clearance in all physical stores, in a subset of physical stores, or a single physical store. In response, an optimal markdown schedule 118 for the inventory item is generated for each physical store indicated. The optimal markdown schedule 118 may include a set of discount prices and associated durations thereof for an entirety of the clearance duration of the item at the respective physical store.

The optimal markdown schedule 118 may be based, at least in part, on the forecasted price sensitivity of the clearance item at the respective store. However, because inventory items being placed on clearance are most often end-of-life items that have not previously been on clearance, no historical clearance data specific to the current inventory item may be available for use in predicting the item's price sensitivity during clearance. Therefore, historical clearance data associated with one or more past clearance items (e.g., actual clearance sales data) may instead be applied to the respective model built for the current inventory item from the models 108 to adjust the forecasted price sensitivity to increase accuracy, as described in greater detail with respect to FIG. 4. Additional optimization may then be performed based on parameters of the request 116, among other data, to obtain the optimal markdown schedule 118 from a plurality of potential markdown schedules for the current inventory item. The optimal markdown schedule 118 may then be updated at predetermined intervals throughout the clearance period.

In some examples, one or more of the data inputs 110 used to build the models 108 and/or facilitate the forecasting or prediction may be generated internally by the service 102 and subsequently stored in the data stores 112. In other examples, one or more of the data inputs 110 may be generated externally by third party services 114 and provided to the service 102 for storage in the data stores 112. The data inputs 110 may include price data, item sales data, inventory data, item data, and store data, among other similar types of data, associated with a plurality of inventory items at a plurality of physical retail stores. Price data may include a number of units of an inventory item sold at a particular price. Item sales data may include a number of units of an inventory items sold. Inventory data may include a number of remaining units of an inventory item. Item data may include information about the inventory item, including product hierarchy information associated with the inventory item. Store data may include information about a physical store, such as a geographical location of a store or a stock-to-sales ratio associated with the store, among other information. The data inputs 110 may also include program metadata. In some examples, the program metadata may be retrieved from the request 116, and may include business rules associated with a clearance program. Example business rules may include a duration of the clearance program, a timing between price discount changes, a minimum and maximum number of allotted discount changes throughout the duration, or any constraints on discount values, among other examples. Business rules may also be associated with consumer protection laws or rules, which may vary based on the states in which the physical stores are located. The data inputs 110 may further include historical clearance data associated with past clearance items. The historical clearance data may include similar data described above, such as price data, item sales data, inventory data, item data, store data, and program data associated with past clearance items. In some examples, each type of data may be stored in separate data stores 112. In other examples, the various types of data may be combined in one or more of the data stores 112.

In one embodiment, the service 102 may interoperate with various applications to enable a user affiliated with the retailer (e.g., a physical retail store manager) to submit the request 116 to and subsequently receive the optimal markdown schedule 118 from the system 106 as a response over a network 120. For example, a user may execute a thin version of an application (e.g., a web browser) or a thick version of the application (e.g., a locally installed application) through a device 122. The device 122 may include a desktop computer, a laptop computer, a tablet computer, a smart phone, or wearable computing device, among other similar devices. An application programming interface (API) 124 may facilitate communication between the service 102 and the device 122 over one or more networks, such as the network 120. For example, receipt of the request 116 at the API 124 may cause the API 124 to trigger a forecasting or prediction phase of the system 106.

Figure 2:
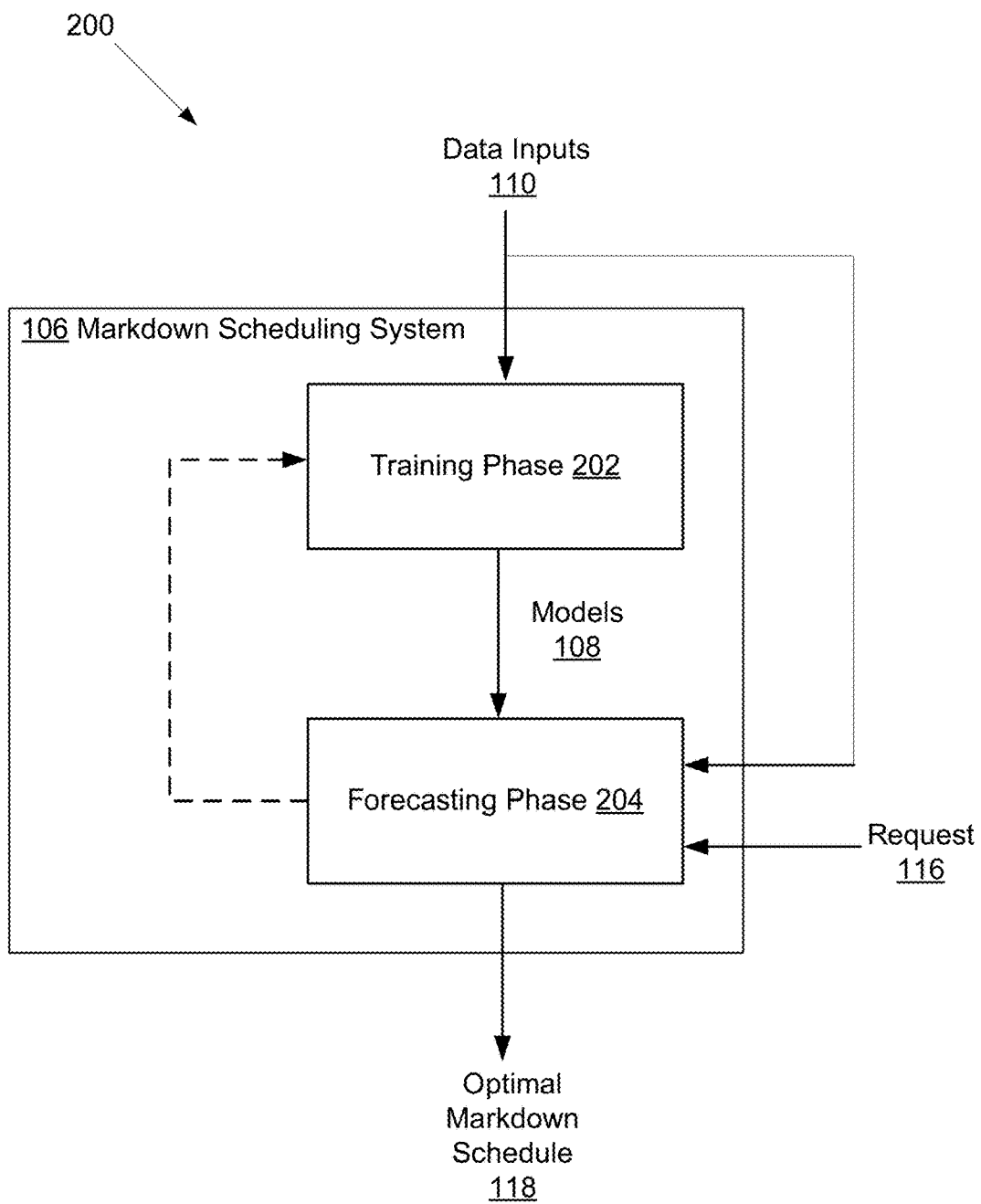
FIG. 2 is a conceptual diagram illustrating example phases of the system.

FIG. 2 is a conceptual diagram 200 illustrating example phases of the system 106 described in detail above with reference to FIG. 1. The example phases include a training phase 202 described in greater detail below with reference to FIG. 3, and a forecasting phase 204 described in greater detail below with reference to FIG. 4. For example, the models 108 may first be built during the training phase 202 based on the data inputs 110 to represent a forecasted price sensitivity of each inventory item on a per-store basis. In some examples, the training phase 202 may occur offline due to increased data processing requirements in order to model each inventory item at each physical store, particularly when there are hundreds or thousands of both inventory items and physical stores. When an inventory item is being placed on clearance at a physical store and the request 116 is received, one of the models 108 representing the forecasted price sensitivity of the inventory item at the physical store may be implemented along with at least some of the data inputs 110 during the forecasting phase 204 to facilitate prediction of the optimal markdown schedule 118 for the inventory item. For example, during the forecasting phase 204, the forecasted price sensitivity of the inventory item at the physical store may be adjusted based on one or more of the data inputs 110, which may be further used to predict the optimal markdown schedule 118.

In some embodiments, feedback based on the optimal markdown schedule 118 determined by the system 106 during the forecasting phase 204 may be used to further train the models 108 and/or adjust future predictions. For example, once the optimal markdown schedule is implemented for the inventory item at the physical store, clearance sales data for that inventory item may be received and an actual price sensitivity may be determined. The actual price sensitivity may be compared to the adjusted, forecasted price sensitivity and provided as feedback for use in training and/or for adjusting future predictions.

Figure 3:
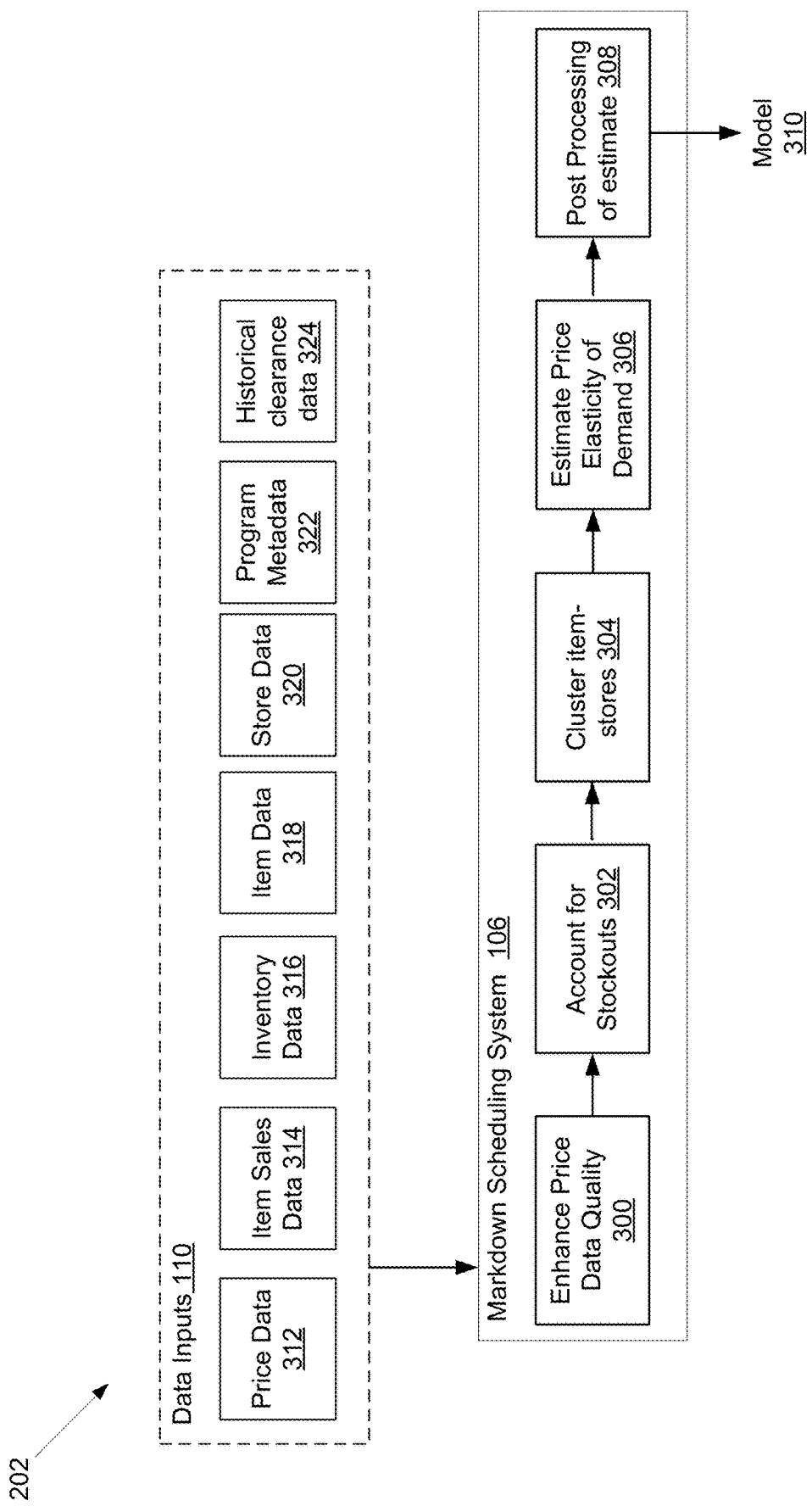
FIG. 3 illustrates an example training phase of the system.

FIG. 3 illustrates an example training phase 202 of the system 106. During the training phase 202, operations 300 to 308 may be performed to model price sensitivity for current inventory items of the retailer by estimating respective price elasticities of demand. In some examples, a model may be built for each current inventory item of the retailer that may potentially be placed on clearance in the future. Therefore, when one of the current inventory items is determined to be placed on clearance and a request similar to request 116 is received, a corresponding model that has already been built and trained may be implemented to predict the optimal markdown schedule for that current inventory item, as described in greater detail with reference to FIG. 4. Accordingly, the system 106 may quickly and efficiently provide the optimal markdown schedule ad-hoc.

The models 108 may be mixed effect regression models that are built and trained using data inputs associated with the current inventory items pre-clearance that may be received as part of the data inputs 110. Examples of at least some of the data inputs 110 may include price data 312, item sales data 314, inventory data 316, item data 318, store data 320, and program metadata 322, among other similar types of data that may be useful in estimating price elasticities of demand, each described in greater detail below.

Additionally, price elasticity of demand for an inventory item may vary significantly across the physical stores, particularly stores located in different geographical regions and communities within those geographical regions (e.g., urban, suburban, and rural communities). For example, consumers at a rural store in the southeast may not be willing to pay as high of a price for an item, depending on the item, as compared to consumers at an urban store in the northeast (e.g., due to the lower cost of living provided by the rural southeast as compared to metropolitan northeast). Accordingly, a price elasticity of demand for that same item may be drastically different between these two stores. Beyond geographical and community based differences, some stores may simply have more sales than others and/or consumers with higher or lower ranges of expendable income, and thus they may experience different price elasticities of demand for the same items. Therefore, when building the models 108, a model is built for a current inventory item on a per-store basis (e.g., a unique model for the current inventory item at each physical store). For example, if both a first store and a second store include a same inventory item, a first model is built to estimate price elasticity of demand for the inventory item at the first store and a second model is built to estimate price elasticity of demand for the inventory item at the second store. However, because at an individual store level, there may not be enough data to create a statistically significant model, similar stores may be identified and clustered to increase the data while still accounting for the differences of price elasticities of demand that may exist across stores, as described with respect to operation 304 below.

In some examples, the models 108 may be generated concurrently. In other examples, the models 108 may be generated sequentially. For clarity, FIG. 3 describes a process to build and train one model 310 that is representative of the process for building and training the plurality of the models 108. In this example, the model 310 may correspond to a current inventory item A at store A that may potentially be placed on markdown or clearance in the future.

The modeling process may begin with data preparation at operation 300, where a quality of price data associated with item A may be enhanced. The price data 312 received as part of the data inputs 110 may include a number of units sold of item A at a particular price at store A. However, the amount of data associated with the single item at the single store may be limited (e.g., data may be limited to two units sold at store A at price of $19.99). In some examples, a probability model may be used to enhance the quality of the price data 312 based on the price data specific to item A at store A. In other examples, additional price data 312 may be received and aggregated with the price data specific to item A at store A to enhance the quality thereof. For example, the price data 312 may also include data borrowed from stores similar to store A, including a number of units sold of item A at a particular price at the similar stores.

Store similarity may be based on similarity of items sold by the stores and/or location of the stores, each described below. Similarity of items sold by the stores may be identified based on the item data 318 that includes product hierarchy information, among other information. A product hierarchy is a manner of organizing inventory. The hierarchy may include a class of the item and a department. As one example, for an item such as a Blu-ray movie, the product hierarchy for the item may include Movies, Music, Books→Movies→Blu-ray Movies. The product hierarchy may be leveraged to determine item similarity between stores. Additionally or alternatively, store similarity may be based on geographic regions or districts in which the stores are located determined from the store data 320 due to the likelihood of these stores selling similar items for a similar price. For example, two stores located within a same city are likely to sell similar items for a similar price as they likely serve a same or at least similar consumer base.

The enhanced price data prepared at operation 300 may be used to approximate demand for item A at store A. However, it is often difficult to capture true demand, and thus measure true price sensitivity of the inventory item, because a stockout may not allow consumers to purchase all items that they may want at a particular price. A stockout may occur when no units of an inventory item remain available for purchase at a physical store (e.g., when an inventory item is out of stock at the physical store). Consequently, only sales, or the number of units actually sold, may be captured and used to approximate demand. Therefore, in some instances, demand may be underestimated because if more items had been in stock or available, then more items may have potentially been sold at that price. This problem is enhanced during clearance periods, where stockouts are the goal and thus more likely, particularly for stores constrained by inventory. Thus, to more accurately approximate demand for the item A, the system 106 may account for an effect of stockouts on demand at operation 302 in order to enhance the signal between the price data prepared at operation 300 and the demand for the item A.

For example, based on historical clearance data 324 from each physical store of the retailer obtained as part of the data inputs 110, a subset of the stores that meet a minimum threshold of sales are determined. For each physical store in the subset of the stores, a percentage change of sales is calculated at different clearance discount percentages using the historical clearance data 324. For example, the different clearance discount percentages may include 30%, 50%, and 70%. Thus, a number of sales at 30% is calculated, a number of sales at 50% is calculated, and a number of sales at 70% is calculated. A percentage change of sales may then be calculated from 30% to 50%, and from 50% to 70%. A distribution is generated for each unique discount, where the $10^{th}$ and $80^{th}$ percentiles are used as a minimum and maximum percentage change allowed at the different clearance discounts.

Some of the physical stores may be constrained by inventory. For example, if the number of units of an inventory item that a store is able to place on clearance is limited to the current number of units in the store's inventory, then the store is constrained by inventory. In other words, the store will not receive any additional units of the item to place of clearance. For physical stores that are constrained by inventory, a value between a minimum number and a maximum number may be randomly chosen to adjust the sales. As an example, a store may be constrained at the 50% clearance discount percentage and have a sales amount of 2 for an item. Further suppose that the $10^{th}$ and $80^{th}$ percentile values at 50% is 1.1 and 10, respectively, and a randomly chosen value between these ranges is 1.6. The store's sales may be adjusted to 2*1.6=3.2. The adjusted sales may represent a predicted number of units that would have been sold had the store not been constrained by inventory to more accurately reflect demand for the inventory item. However, because it is possible that a store identified as constrained may not actually have constrained sales, the sales are only adjusted if, based on a random number generator, a certain value is generated. For example, a random number between 0 and 1 is generated for each constrained store. If the number is greater than a predefined value, such as 0.1, the store's sales may be adjusted.

Therefore, if the physical store for which the price sensitivity of the current inventory item is being modeled is constrained by inventory and the random number generated is greater than the predefined value, the sales may be adjusted as described above. An additional empirical adjustment may be made to ensure that lifts are monotonically increasing at each clearance discount. Specifically, the total adjusted sales at 30% must be lower than the adjusted sales at 50% and 70%, and the total adjusted sales at 50% must be lower than the adjusted sales at 70%. The adjusted sales may then be used in conjunction with the enhanced price data to approximate the demand for item A at store A.

At operation 304, the system 106 may perform clustering. Clustering may be performed as part of a data cleansing process to account for the sparsity of data for an inventory item on an individual store level (e.g., to account for the sparsity of data for item A at store A). As one example, stores having similar stock-to-sales ratio may be grouped into a cluster, also referred to herein as a current item-cluster. A stock-to-sale ratio may be the ratio of the number of units of an item available for sale versus the number of units of the item actually sold. In some examples, the stock-to-sales ratio may be calculated and compared with respect to item A (e.g., the number of units of item A available for sale relative to the number of units of item A actually sold). For each of the stores within the current item-cluster, operations similar to operations 300 and 302 may have been performed to determine the approximate demand for the item A at the respective store. In some examples, the approximate demand determined for the inventory item A at each store within the current item-cluster may then be aggregated.

At operation 306, the system 106 may estimate price elasticity of demand for item A. Price elasticity of demand may be a measure of how much the quantity demanded of a good responds to a change in the price of that good that is computed as the percentage change in the quantity demanded divided by the percentage change in price. The price elasticity of demand for item A may be determined based on the enhanced price data and aggregated approximate demand. The estimated price elasticity of demand may reflect the forecasted price sensitivity of item A.

In some examples, Bayesian statistical techniques may be implemented to estimate the price elasticity at operation 306. At a high level, using the Bayesian statistical techniques, a mean price elasticity of demand may be determined across the physical stores within the cluster. Depending on an amount of data available for the item A at store A (e.g., the store for which the price sensitivity of item A is being modeled), the price elasticity of demand for item A at store A may be estimated by either pulling away from the mean or pulling toward the mean. For example, if there is sufficient data available for the item A at store A for calculating the price elasticity of demand, the price elasticity of demand for item A at store A may be estimated by pulling away from the mean closer to the price elasticity of demand calculated from the available data. In contrast, if there is insufficient data available for the item A at store A for calculating the price elasticity of demand, the price elasticity of demand for item A at store A may be estimated by pulling toward the mean from the price elasticity of demand calculated from the available data.

At a lower level, Bayesian statistical techniques generally involve computation of a conditional distribution of unobserved variables given observed data. In a financial time series setting, the analysis involves inferring what has happened to a series of data points in the past (e.g., the observed data) and predicting what will happen to it in the future. For example, the observed data may be asset prices, $y=(y_1, \ldots, y_T)$, the unobserved variables are a parameter vector, $\theta$, and latent variables, $x=(x_1, \ldots, x_T)$, and the inference problem is solved by p $(\theta, x|y)$, the posterior distribution. Characterizing the posterior distribution, however, is often difficult asp $(\theta, x|y)$ is often complicated and high-dimensional. Therefore, in some examples, Markov chain Monte Carlo (MCMC) methods may be implemented. The MCMC methods may provide a simulation based method for sampling from the high-dimensional distribution, where the samples may be used for estimating the price elasticity. For example, a Markov chain is generated having a stationary distribution of p $(\theta, x|y)$. This high-dimensional distribution may be characterized by a larger number of lower dimensional conditional distributions. Iterative sampling from these lower dimensional conditional distributions may be performed to create simulations that are then used to estimate integrals via Monte Carlo that naturally arise in Bayesian inference.

Methods for estimating the price elasticity of demand are not limited to Bayesian statistical techniques. Other statistical techniques known to those of ordinary skill in the art that are suitable for low volumes of data may be employed to estimate the price elasticity of demand at operation 306.

At operation 308, the system 106 may perform post-processing steps to mitigate any issues or potential errors with the statistical modeling performed at operation 306. For example, one potential error may be a false positive result indicating that a price of item A should be increased when placed on clearance rather the decreased, which is counter-intuitive to clearance.

Following post-processing at operation 308, the model 310 may be output by the system. The model 310 may correspond to or represent a forecasted price sensitivity for item A at store A. The model 310 may be comprised of one or more features (or coefficients), where a feature is an individual measurable property or characteristic of a phenomenon being observed. The model 310 may be then be stored in association with the inventory item A and the store A as described in greater detail with reference to FIG. 1 to facilitate retrieval and application of the model 310 during the forecasting phase 204, as described in detail below with reference to FIG. 4.

In some examples, the models 108 including the model 310 may be updated at predetermined intervals until the current inventory item, such as item A, is placed on clearance at the physical store. Updating allows an accurate representation of the item's forecasted price sensitivity. As one example, the model may be updated every three months.

Figure 4:
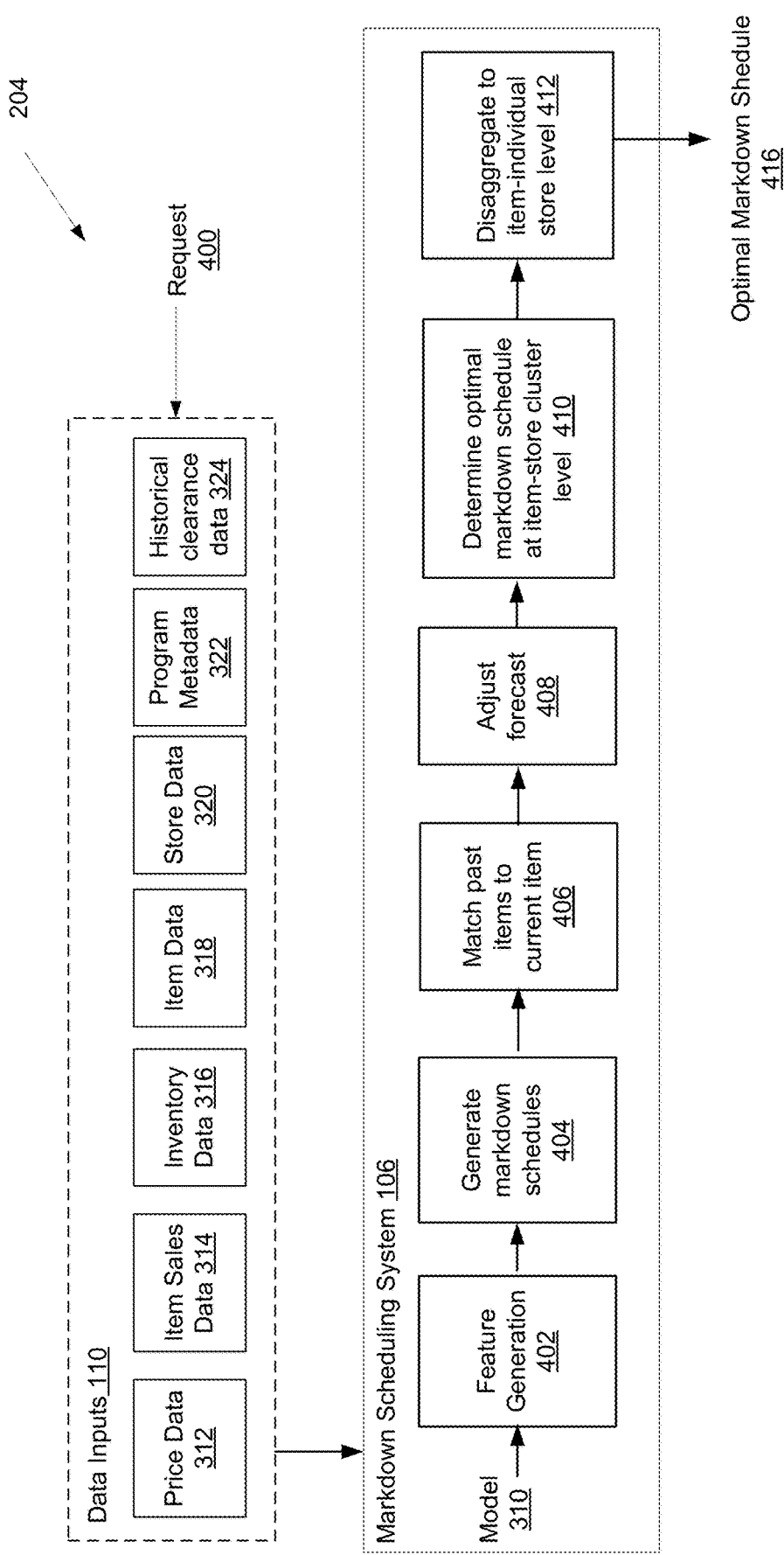
FIG. 4 illustrates an example forecasting phase of the system.

FIG. 4 illustrates an example forecasting phase 204 of the system 106. During the forecasting phase 204, the system 106 may perform operations 402 to 412 in response to receiving a request 400 for a markdown schedule for the inventory item A that is being placed on clearance at store A.

At operation 402, feature generation may be performed using the model 310 built for the inventory item A at store A as described with reference to FIG. 3 above. For example, new features may be generated based on one or more of the existing features of the model 310. The new features may encapsulate a feature interaction (e.g., a relationship or dependence between two features having a threshold strength), where addition of these features to the model 310 may increase an accuracy of the model 310 to increase a predictive power of the system 106. As one example, two of the features of the model 310 may be price and demand for the item A, and a new feature built may be a quality of the item A to further strengthen the understanding of the relationship between price and demand of item A. For example, high quality products at a low price may have a higher demand, whereas high or low quality products at a high price and low quality products at a low price may have less demand. The new features may be generated using similar data to the data described with respect to building the model 310 in FIG. 3. For example, the price data 312, the item sales data 314, the inventory data 316, the item data 318, and the store data 320.

At operation 404, the system 106 may generate a plurality of markdown schedules representing all possible combinations of markdown schedules for item A at store A. The markdown schedules may be generated based on parameters of the request 400. In addition to the inventory item and store for which the markdown schedule is requested, other example parameters of the request 400 may include business rules or constraints for the clearance. For example, a goal associated with the clearance (e.g., to maximize revenue and/or reduce inventory), a duration of the clearance (e.g., a number of days or weeks during which the inventory item will be on clearance), a timing between price discount changes, a minimum and/or a maximum number of price discount changes allowed, and values available for the price discounts, among other similar constraints. The business rules may also include rules based upon consumer protection laws for a state in which state A is located. In some examples, these parameters may also be stored as part of the program metadata 322.

At operation 406, one or more past clearance items may be matched to item A. For example, a matching process may be implemented to determine which of the past clearance items are likely to best inform what will happen to item A when placed on clearance. In some examples, the model 310 for item A is built based on data from a current item-cluster (e.g., a cluster of physical stores) rather than an individual store, as discussed with respect to operation 304 in FIG. 3. Data for past clearance items may be available at a similar level (e.g., a past item-cluster). Thus, the matching process may more precisely include determining which past item-cluster is most likely to be applicable to the current item-cluster. A plurality of factors are used in the determination, including one or more of a time of year, a stock-to-sales ratio, a level of inventory, pre-clearance sales, a number of stores, and a clearance program length.

Once past clearance items (e.g., one or more past item-clusters) that match item A are determined, such as item B, a model that represents an actual price sensitivity of item B may be retrieved. For example, a model similar to the model 310 that was built for the item B may be retrieved, but unlike the model 310, the model also includes or accounts for actual past sales when item B was on clearance (e.g., includes historical clearance data 324 for item B).

At operation 408, item A's forecasted price sensitivity may be adjusted. For example, the model for the matched past clearance item (e.g., the model that represents the actual price sensitivity of item B) may be applied to the model 310 with the newly added features from operation 402 to adjust the forecast based on actual past clearance sales. For example, assuming customers will respond similar to item A on clearance as they responded to item B on clearance, applying the model that represents the actual price sensitivity of item B that accounts for the past clearance sales may proactively adjust for a likely similar consumer response to item A when on clearance. This may provide a more accurate prediction of the price elasticity of demand for item A once placed on clearance. In some examples, the adjustment may be a modification of the forecasted price sensitivity item A based on the actual price sensitivity of item B. In other examples, the adjustment may be a replacement of the forecasted price sensitivity for item A with the actual price sensitivity of item B.

At operation 410, the system 106 may determine an optimal markdown schedule from among the plurality of markdown schedules generated for item A at operation 404. The determination may be based on the adjusted forecast for the clearance price sensitivity for item A and the goals for the clearance provided in the request 400. As one example, the optimal markdown schedule for item A may be a four week program, where item A is discounted at 30% the first week, 50% the second and third weeks, and 70% the fourth week. In some examples, the system 106 may implement a full grid search to perform the optimization in operation 410. In other examples, the system 106 may implement a markdown decision process that utilizes reinforcement learning techniques to perform the optimization in operation 410. In some examples, the markdown decision process may take into account the possibility of errors associated with the adjusted forecast determined at operation 408.

As previously described with reference to operation 304 in FIG. 3, stores having similar stock-to-sales ratios as the store A are clustered in the current item-cluster and thus the model 310 for item A at store A that is generated in the training phase 202 and implemented in the forecasting phase 204 to obtain the optimal markdown schedule represents the current item-cluster. At operation 412, the system 106 may disaggregate the result of operation 410 from the current item-cluster to an item-individual store level to provide the optimal markdown schedule 416 for item A at store A, including a number of inventory items to be allocated to store A for the clearance. The disaggregation performed at operation 412 involves determining a number of inventory items to allocate to each store within the cluster based on each store's current inventory levels for item A and past demand for item A pre-clearance. For example, the current item-cluster may be comprised of 10 stores including store A, and an optimal markdown schedule determined at operation 410 may indicate an inventory level of 500 units of item A to place on markdown. The disaggregation may break down the schedule to a per store basis to allocate the 500 units of item A among the 10 stores based on each store's current inventory level for item A and pre-clearance demand for item A. Once disaggregated, the optimal markdown schedule 416 for item A at store A, including the number of units of item A to be allocated, may be provided as output of the system 106 in response to the request 400.

In some examples, operations 402 to 412 may be repeated to update the optimal markdown schedule at predetermined intervals throughout the duration of the clearance. For example, the operations 402 to 412 may be repeated weekly until the end of the clearance, and the optimal markdown schedule 416 may be updated based on what has happened in the previous week (e.g., amounts of sales at a particular clearance price, remaining inventory, changed clearance goals, etc.). An example of an updated optimal markdown schedule following a repeat of operations 402 to 412 is described with reference to FIG. 6 below.

Figure 5:
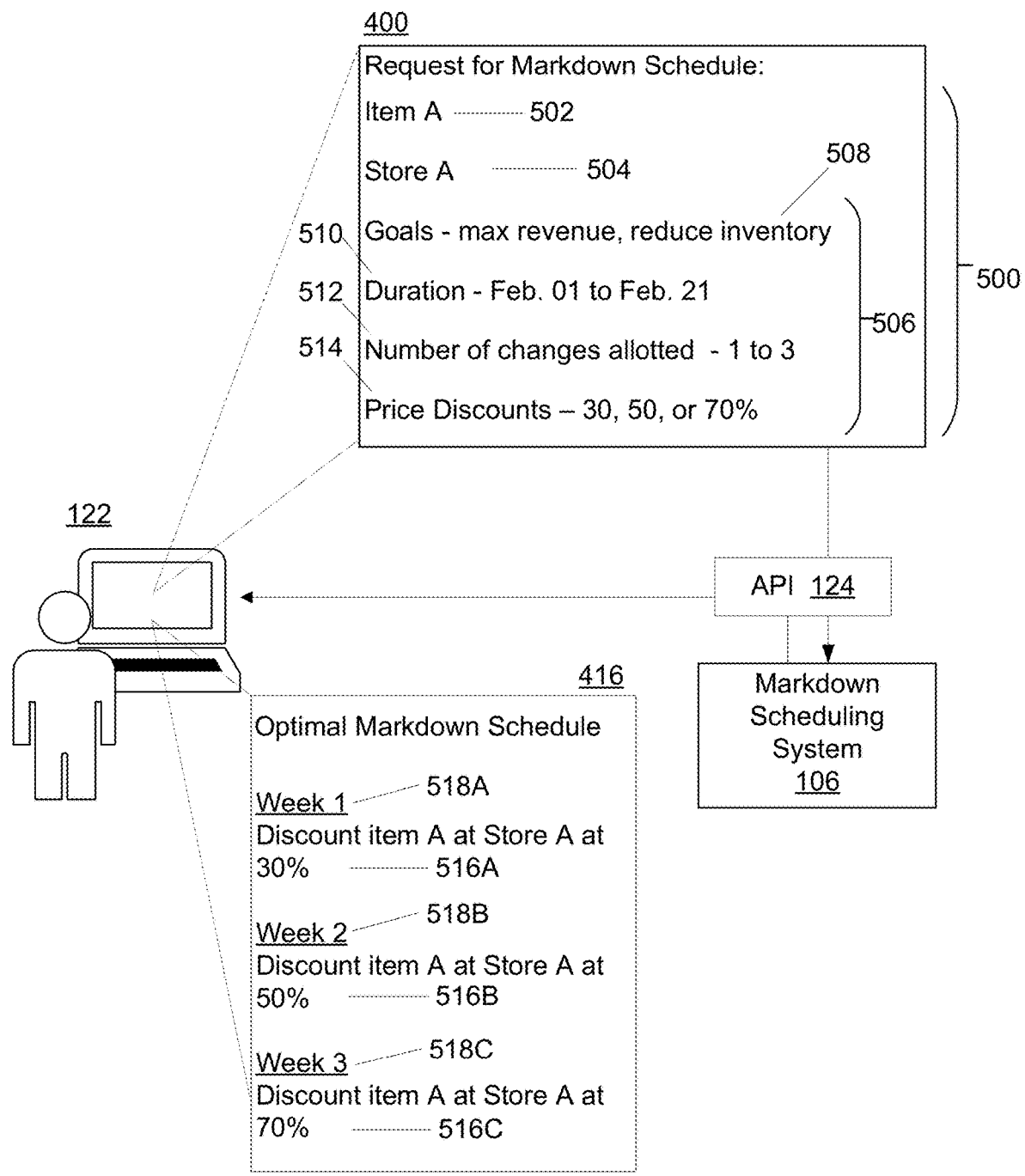
FIG. 5 conceptually illustrates the request received as input and optimal markdown schedule provided as output by the system.

FIG. 5 conceptually illustrates the request 400 received and optimal markdown schedule 416 output by the system 106, as described with reference to FIG. 4. A user, such as a manager of the physical retail store A or a pricing specialist associated with a retail enterprise may submit the request 400 to the system 106. The request 400 may be submitted through an application associated with the system 106 and/or the service 102 that is executing on the computing device 122 of the user, as described in detail with reference to FIG. 1. In some examples, the system 106 may communicate with the computing device 122 using the API 124. Receipt of the request 400 at the API 124 may trigger the forecasting phase 204 of the system 106.

The request 400 may be comprised of parameters 500 that identify a specific inventory item 502, a specific store 504, and one or more business rules 506. Non-limiting and non-exclusive examples of the business rules 506 may include goals 508 for the clearance, a duration 510 of the clearance (e.g., a date range), a minimum and maximum number of price discount changes allotted 512, and values of price discounts allotted 514. As illustrated, the request 400 may be for a markdown schedule for inventory item A at store A (e.g., the store managed by the user) that will last for 3 weeks from February 1 to 21, can have up to 3 price discount changes at 30, 50, or 70% within those 3 weeks, and aims to maximize revenue while minimizing inventory remaining at the end of the markdown schedule.

The user may provide the parameters 500 as input through a user interface of the application executing on the computing device 122. In some examples, a fillable form or template may be provided to prompt the user to provide each of the parameters 500. In further examples, the fillable form or template may include a drop down menu, or other similar menu, that includes options for one or more of the parameters 500 for the user's selection. In yet further examples, one or more of the parameters 500 may be automatically populated.

As one example, one or more of the parameters 500 may be automatically defined or have limited options based on the inventory item input by the user. For example, if the inventory item input by the user is within a particular class or department, the duration of the markdown and/or the number of changes allotted may be automatically populated with a particular length of time and number of changes defined for that class or department. As another example, one or more of the parameters 500 may be automatically defined or have limited options based on the store input by the user. For example, if the store input by the user is within a particular geographical region, the duration of the markdown and/or the number of changes allotted may be automatically populated to a particular length of time and number of changes for that region. Alternatively, one or more of the parameters 500 may be automatically defined or have limited options based on policies of the retailer as a whole rather than on an individual item or store basis. For example, as a policy, the retailer may only allow price discount values of 30, 50, and 70% in physical retails stores.

Once the request 400 is received, the system 106 may perform operations 402 to 412 described in detail above with reference to FIG. 4 to determine the optimal markdown schedule 416 for the inventory item A at the store A responsive to the request 400. In some examples, the system 106 may provide the optimal markdown schedule 416 to the computing device 122 via the API 124. The optimal markdown schedule 416 may be displayed to the user through the user interface of the application executing on the computing device 122.

The optimal markdown schedule 416 may define one or more discounts 516A, 516B, 516C and an associated discount duration 518A, 518B, 518C. For example, the optimal markdown schedule 416 may recommend to apply a 30% discount 516A to the item A in the first week 518A, apply a 50% discount 516B to the item A in the second week 518B, and apply a 70% discount 516C to the item A in the third week 518C.

In some examples, the optimal markdown schedule 416 for the inventory item A at the store A may be updated and adjusted at predetermined intervals throughout the duration of the clearance period for item A at store A to account for the sales and remaining inventory levels for item A at the store A that have occurred, as described with greater detail below with FIG. 6.

Figure 6:
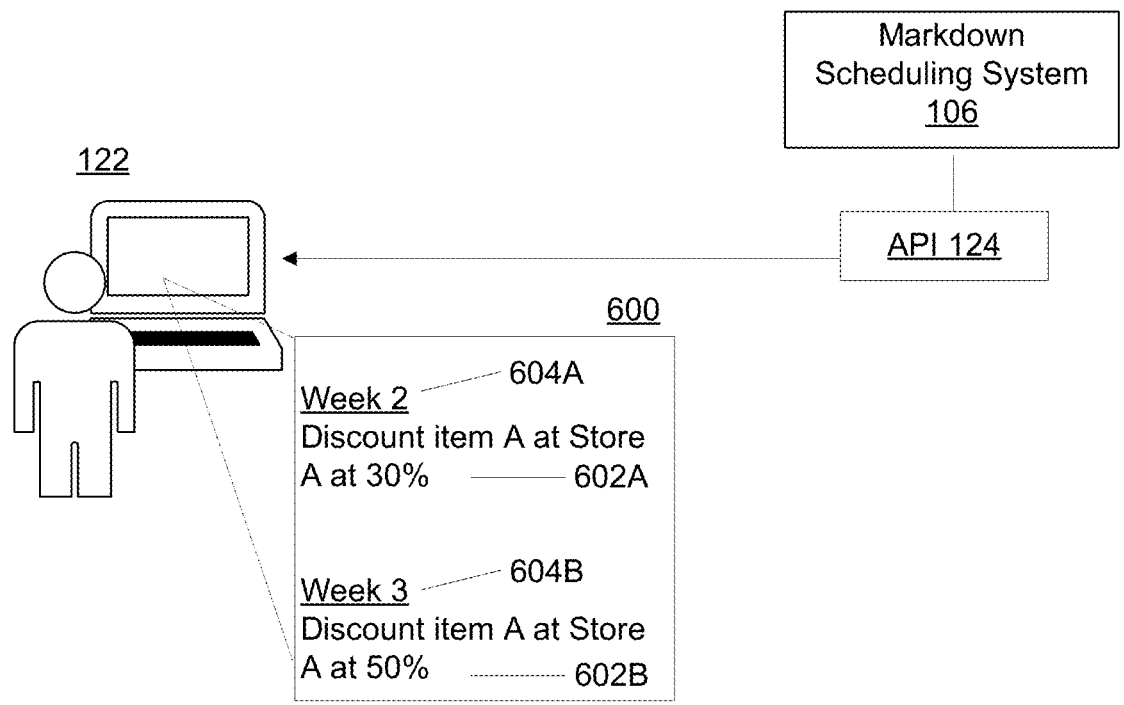
FIG. 6 conceptually illustrates an updated optimal markdown schedule provided as output by the system.

FIG. 6 conceptually illustrates an updated optimal markdown schedule 600 output by the system 106. In some examples, the system 106 may repeat operations 402 to 412 described in detail above with reference to FIG. 4 at predetermined intervals throughout the duration of the clearance period for item A at store A to generate an updated optimal markdown schedule 600 for the inventory item A at store A. In some examples, the system 106 may provide the updated optimal markdown schedule 600 to the computing device 122 via the API 124. The updated optimal markdown schedule 600 may be displayed to the user through the user interface of the application executing on the computing device 122. In some examples, the application may be automatically launched on the computing device 122 to display the updated optimal markdown schedule 600. In other examples, the application may generate a notification or alert to indicate to the user that the schedule has been updated, where the user may then select to have the application launched and/or the updated optimal markdown schedule 600 displayed.

The markdown schedule may be updated at predetermined intervals throughout the duration of the markdown for item A at store A. The schedule is updated to account for the sales and remaining inventory levels for item A at the store A that have occurred since the previous determination or update of the markdown schedule. In one example, the predetermined intervals may be weekly.

The updated optimal markdown schedule 600 may define one or more discounts 602A and 602B and an associated discount duration 604A and 604B for the remaining duration of the markdown. For example, the first week of the three week duration may have passed. In this example scenario, the clearance sales performance behavior of item A during a first week of markdown may reveal a different price sensitivity (e.g., a higher than expected demand in response to the price change) than forecasted. For example, almost all of the inventory for item A at store A may have been sold at the 30% discount during the first week. Therefore, in order to maximize revenue, the updated optimal markdown schedule 600 may recommend maintaining the 30% discount 602A in the second week 604A rather than increasing to a 50% discount as initially recommended in the optimal markdown schedule 416. Additionally, the updated optimal markdown schedule 600 may recommend to apply a 50% discount 602B to the item A in the third week 604B rather than rather than the 70% discount initially recommended in the optimal markdown schedule 416. Once the second week has passed, the schedule may be updated again based on the current inventory levels and sales of item A during the second week at the 30% discount to determine at what discount to place item A at for the third and final week of the clearance.

The examples provided in FIGS. 1 through 6 are illustrated with specific services, systems, applications, devices, and processes. Embodiments are not limited to environments according to these examples. Similar optimization of inventory item markdown schedules for physical retail stores may be implemented in environments employing fewer or additional services, systems, applications, devices, and processes. Furthermore, the example services, systems, applications, devices, and processes shown in FIGS. 1 through 6 may be implemented in a similar manner with other values using the principles described herein.

Figure 7:
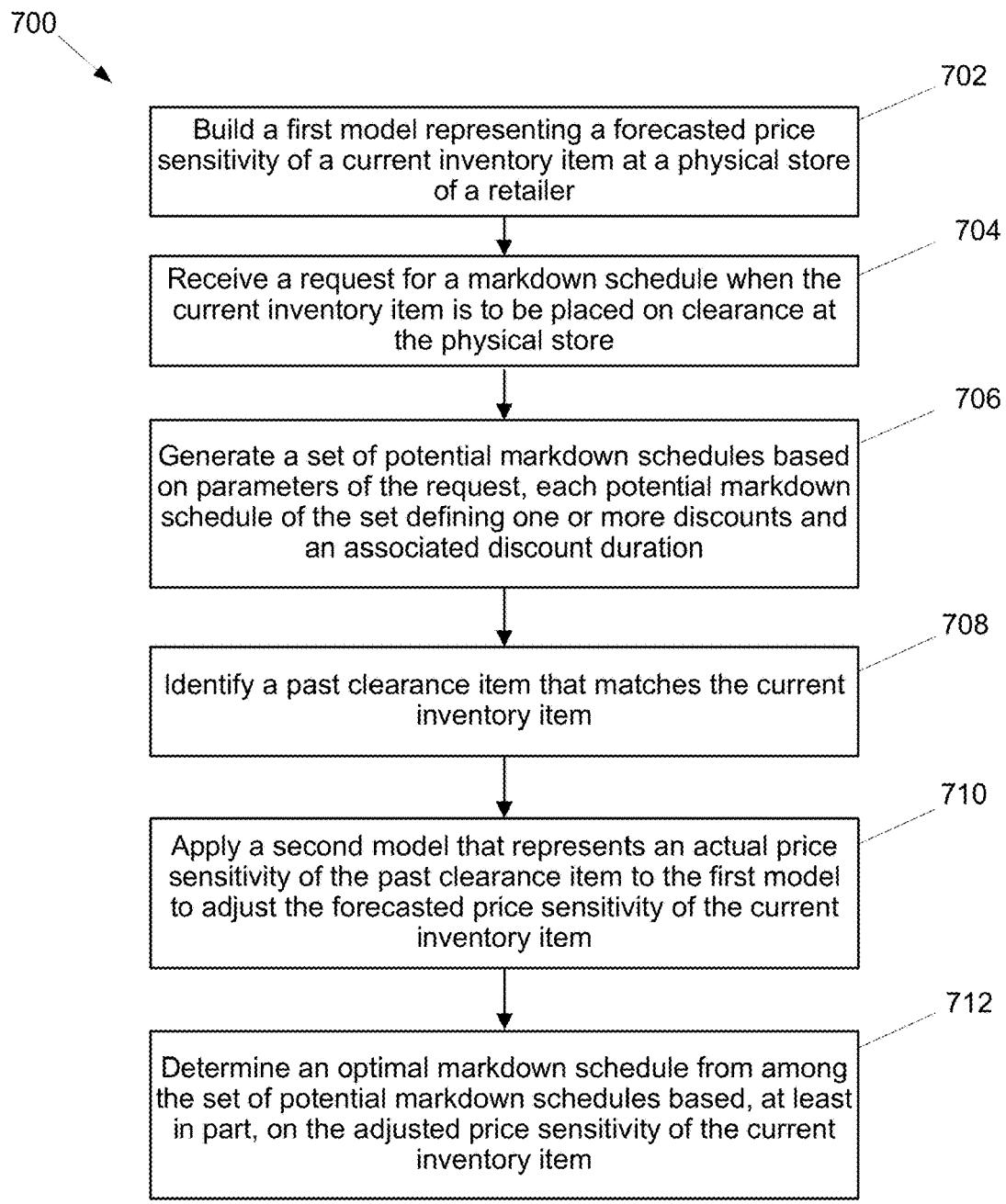
FIG. 7 illustrates an example method for optimizing an inventory item markdown schedule.

FIG. 7 illustrates an example method 700 for optimizing an inventory item markdown schedule. The method 700 may be performed by the system 106 described with reference to FIG. 1. The method 700 may begin at operation 702, where the system 106 builds a first model that represents a forecasted price sensitivity of a current inventory item at a physical store of a retailer. An example of the operation 702 is illustrated and described in further detail with reference to FIG. 8. As described in further detail with reference to FIG. 8 below, the first model may estimate the price elasticity of demand for the current inventory item from which the forecasted price sensitivity is measured. The model may be updated at predetermined intervals until the current inventory item is placed on clearance at the physical store. As one example, the model may be updated quarterly (e.g., every three months).

At operation 704, the system 106 may receive a request for a markdown schedule when the current inventory item is to be placed on clearance at the physical store. Parameters of the request may include the current inventory item that is being placed on clearance, the physical store at which the current inventory item is being placed on clearance, and one or more business rules. Example business rules may set constraints on the clearance program. Example business rules may include one or more clearance goals, a duration of the clearance, a timing between price discount changes, a minimum or maximum number of price discount changes allotted, and available values for the price discounts. Other business rules may include rules based on consumer protection laws for a state in which the physical store is located.

At operation 706, the system 106 may generate a set of potential markdown schedules based on parameters of the request. Each potential markdown schedule of the set may define one or more discounts and an associated discount duration. For example, if the business rules from the parameters indicate a clearance duration of three weeks and no more than three discount changes, a markdown schedule for each possible combination of price discount changes (up to three) throughout a three week duration may be generated.

Because placing an inventory item on clearance inherently involves price changes, particularly price decreases, it may be beneficial to understand how price sensitivity of the inventory item may change from pre-clearance to clearance in order to most effectively determine the markdown schedule with the most optimal discount percentages and associated durations thereof to maximize revenue throughout the clearance period. However, because inventory items being placed on clearance are most often end-of-life items that have not previously been on clearance, no historical clearance price sensitivity data specific to the current inventory item may be available to predict clearance effects on price sensitivity. Therefore, to predict clearance effects on price sensitivity and correspondingly adjust the forecasted price sensitivity of the current inventory item, historical clearance data associated with one or more past clearance items may be utilized.

At operation 708, the system 106 may identify a past clearance item that matches the current inventory item. A matching process may be implemented to determine which of the past clearance items are likely to best inform what will happen to item A when placed on clearance, as described in detail with reference to FIG. 4. Once a past clearance item that matches the current inventory item is determined, a second model that represents an actual price sensitivity of the past clearance item may be retrieved. For example, the second model may be built similarly to the first model but also includes clearance sales data from when the past clearance item was on clearance.

At operation 710, the second model that represents the actual price sensitivity of the past clearance item may be applied to the first model to adjust the forecasted price sensitivity of the current inventory item. For example, assuming customers will respond similar to the current inventory item on clearance as they responded to the past clearance item on clearance, applying the second model that accounts for the past clearance sales to the first model may proactively adjust the forecasted price sensitivity. This may provide a more accurate prediction of the price elasticity of demand for the current inventory item once placed on clearance. In some examples, the adjustment may be a modification of the forecasted price sensitivity for the current inventory item based on the actual price sensitivity of the past clearance item. In other examples, the adjustment may be a replacement of the forecasted price sensitivity for the current inventory item with the actual price sensitivity of the past clearance item. If more than one past clearance item is identified as matching the current inventory item, the corresponding model for each matched past clearance item may be applied to the first model as described above to further adjust the forecasted price sensitivity of the current inventory item.

At operation 712, the system 106 may determine an optimal markdown schedule from among the set of potential markdown schedules based on the adjusted price sensitivity of the current inventory item. The optimal markdown schedule may be further determined based on the clearance goals included as business rules within the parameters of the request. Example goals may be to maximize revenue and/or minimize inventory levels of the current inventory item. In some examples, grid searching may be implemented to determine an optimal markdown schedule. In other examples, a markdown decision process based on reinforcement learning techniques may be implemented.

The operations 702 to 712 are included for illustration purposes. Optimization of markdown schedules for inventory items may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 8:
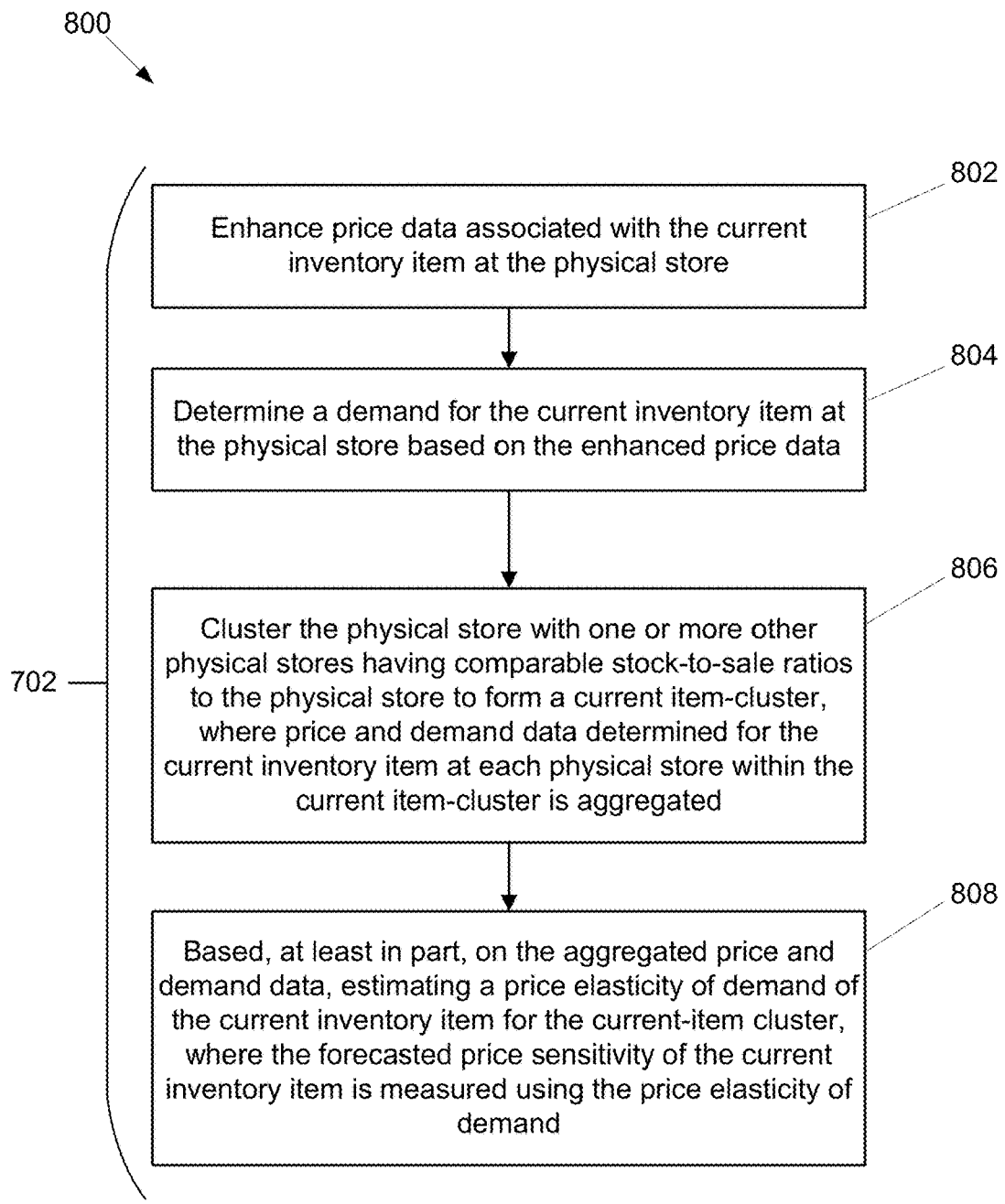
FIG. 8 illustrates an example method for building a model for an inventory item at a physical retail store.

FIG. 8 illustrates an example method 800 for building a model for an inventory item at a physical retail store. In some examples, the method 800 performed by the system 106 may be used to at least partially perform the operation 702 of the method 700 shown in FIG. 7 to build the first model. A retailer may have a plurality of physical stores, as well as an online store, through which a plurality of inventory items may be sold to consumers. Due to the unique challenges presented when predicting price sensitivity of inventory items being sold at the physical stores, the system 106 may build a model specific to each current inventory item that may potentially go on clearance in the future at each physical store by performing at least operations 802 to 808.

The method 800 may begin at operation 802, where the system 106 may enhance price data associated with a current inventory item at a physical store. For example, price data defining a number of units of the current inventory item sold at a particular price at the physical may be retrieved. Due to the sparsity of data when looking at an individual store, price data for other physical stores selling the current inventory item may also be retrieved. Particularly, price data from other physical stores that are similar to the physical store may be retrieved as consumer behavior among these stores is more likely to be analogous. Examples for identifying similar stores for enhancing price data is described above with reference to FIG. 3.

At operation 804, the system 106 may determine a demand for the current inventory item at the physical store based on the enhanced price data. In some examples, the signal between price and demand may be enhanced by accounting for a stockout effect, as described in detail above with reference to FIG. 3.

At operation 806, the physical store may be clustered with one or more other physical stores that have stock-to-sale ratios comparable to a stock-to-sale ratio of the physical store to form a current item-cluster. Price and demand data determined for the current inventory item at each physical store within the current item-cluster may be aggregated. For example, the enhanced price data determined at operation 802 and demand determined at operation 804 for the physical store may be aggregated with price and demand data similarly determined for the one or more other physical stores within the current item-cluster.

Use of such price data from other physical stores, and stock-to-sale information from other similar physical stores, allows for improved accuracy in calculating the optimized schedule by a computing device executing that optimization. Still further, use of different collections of physical stores based on similar customer behavior and similar stock-to-sale ratios improves flexibility of the calculation, further improving accuracy. This improved accuracy also reduces remaining undesirable physical inventory following implementation of the clearance program.

At operation 808, a price elasticity of demand of the current inventory item for the current item-cluster may be estimated based, at least in part, on the aggregated price and demand data. The price elasticity of demand may be a coefficient used to measure the forecasted price sensitivity of the current inventory item. The model built may then be applied to facilitate forecasting or prediction of an optimal markdown schedule for the inventory item when it is to be placed on clearance at the physical retail store, as described above with reference to FIG. 7.

The operations 802 to 808 are included for illustration purposes. Building of a model to represent forecasted price sensitivity of a current inventory item at a physical store of a retailer may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 9:
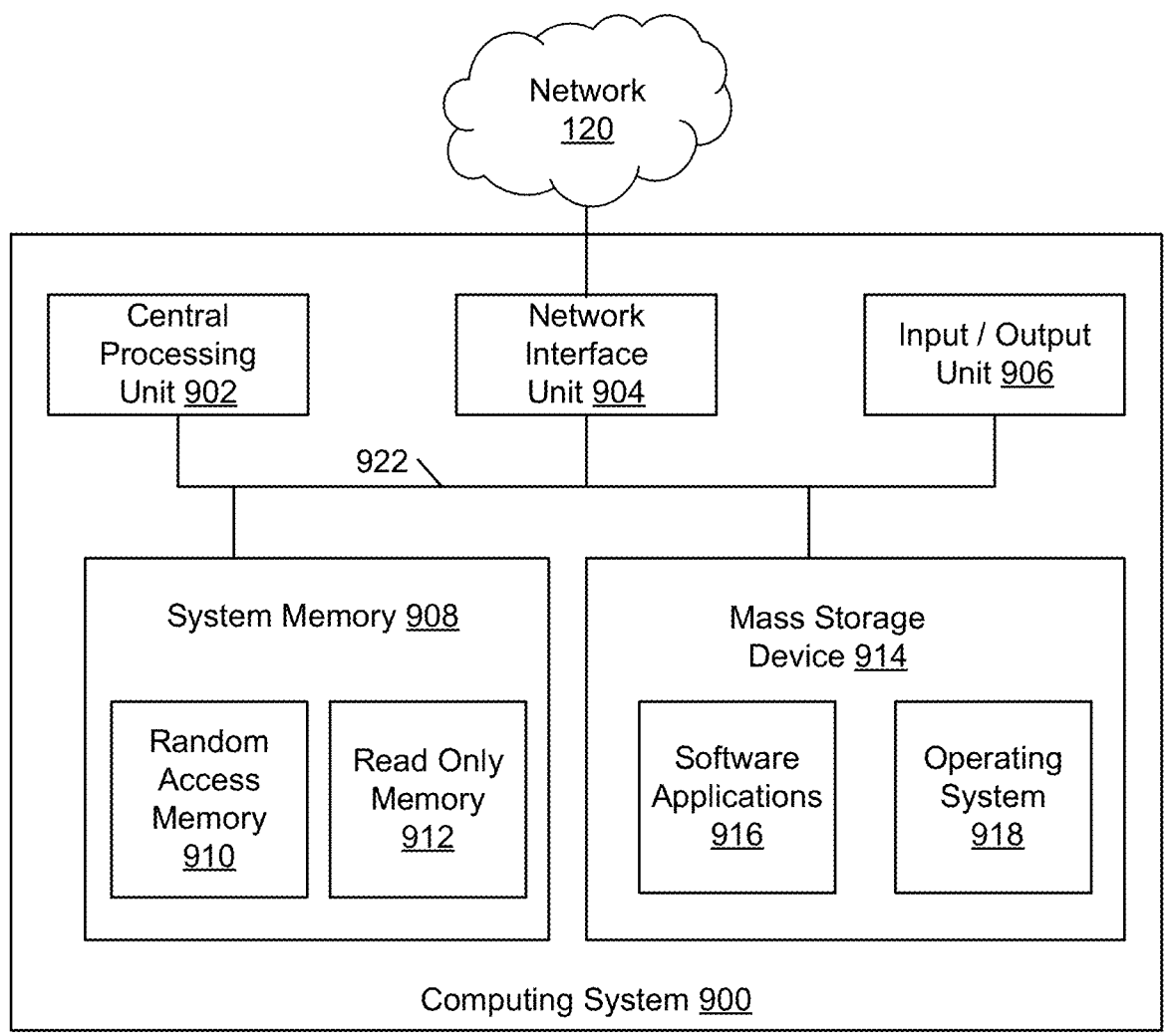
FIG. 9 illustrates an example block diagram of a computing system.

FIG. 9 illustrates an example block diagram of a computing system 900. One or more aspects of the computing system 900 can be used to implement the service 102 and the system 106 as described in greater detail with reference to FIG. 1.

In the embodiment shown, the computing system 900 includes at least one CPU (Central Processing Unit) 902, a system memory 908, and a system bus 922 that couples the system memory 908 to the CPU 902. The system memory 908 includes RAM (Random Access Memory) 910 and ROM (Read-Only Memory) 912. A basic input/output system that contains the basic routines that help to transfer information between elements within the computing system 900, such as during startup, is stored in the ROM 912. The computing system 900 further includes a mass storage device 914. The mass storage device 914 is able to store software instructions and data. In many examples, the one or more processors 104 are each implemented as the at least one CPU 902.

The mass storage device 914 is connected to the CPU 902 through a mass storage controller (not shown) connected to the system bus 922. The mass storage device 914 and its associated computer-readable data storage media provide non-volatile, non-transitory storage for the computing system 900. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 900.

According to various embodiments of the invention, the computing system 900 may operate in a networked environment using logical connections to remote network devices through the network 120. The computing system 900 may connect to the network 120 through a network interface unit 904 connected to the system bus 922. It should be appreciated that the network interface unit 904 may also be utilized to connect to other types of networks and remote computing systems. The computing system 900 also includes an input/output unit 906 for receiving and processing input from a number of other devices, including a touch user interface display screen, or another type of input device. Similarly, the input/output unit 906 may provide output to a touch user interface display screen or other type of output device.

As mentioned briefly above, the mass storage device 914 and the RAM 910 of the computing system 900 can store software instructions and data. The software instructions include an operating system 918 suitable for controlling the operation of the computing system 900. The mass storage device 914 and/or the RAM 910 also store software instructions, that when executed by the CPU 902, cause one or more of the systems, devices, or components described herein to provide functionality described herein. For example, the mass storage device 914 and/or the RAM 910 can store software instructions that, when executed by the CPU 902, cause the computing system 900 to receive and execute process for building and applying models to determine optimal markdown schedules for clearance items in physical retail stores.

In some embodiments, due to relatively large-scale data that may be available from an enterprise, a distributed computing system may be utilized, including a plurality of communicatively connected computing devices such as the computing system 900 seen in FIG. 9.

Referring to FIGS. 1-9 generally, and according to some examples, methods for optimizing an inventory item markdown schedule are described. An example method may include building a first model that represents a forecasted price sensitivity of a current inventory item at a physical store of a retailer, receiving a request for a markdown schedule when the current inventory item is to be placed on clearance at the physical store, and generating a set of potential markdown schedules based on parameters of the request, each potential markdown schedule of the set defining one or more discounts and an associated discount duration. The method may also include identifying a past clearance item that matches the current inventory item, applying a second model that represents an actual price sensitivity of the past clearance item to the first model to adjust the forecasted price sensitivity of the current inventory item, and determining an optimal markdown schedule from among the set of potential markdown schedules based, at least in part, on the adjusted price sensitivity of the current inventory item.

In other examples, building the first model may include enhancing price data associated with the current inventory item at the physical store, determining a demand for the current inventory item at the physical store based on the enhanced price data, clustering the physical store with one or more other physical stores having stock-to-sale ratios comparable to a stock-to-sale ratio of the physical store to form a current item-cluster, where price and demand data determined for the current inventory item at each physical store within a current item-cluster is aggregated, and based, at least in part, on the aggregated price and demand data, estimating a price elasticity of demand of the current inventory item for the current item-cluster, where the forecasted price sensitivity of the current inventory item is measured using the price elasticity of demand. Determining the optimal markdown schedule may also include determining a number of units of the current inventory item for allocation to the physical store based on one or more of current inventory levels and pre-clearance demand for the current inventory item across each of the physical stores in the cluster.

In further examples, enhancing the price data associated with the current inventory item at the physical store may include aggregating price data for the inventory item at the physical store with price data for the inventory item at one or more other physical stores similar to the physical store. Determining the demand for the current inventory item at the physical store may include determining an effect of a stockout of the current inventory item on the demand, and adjusting the demand based on the determined stockout effect. Determining the stockout effect may include determining a subset of physical stores from a totality of physical stores of the retailer having a minimum threshold of sales based on historical clearance data, determining a percentage change of sales at one or more clearance discount percentages for each physical store in the subset of the physical stores, and generating a distribution for each unique clearance discount, where the distribution includes a minimum and maximum value representing a minimum and maximum percentage change allowed at the respective clearance discount. If the physical store for which the request for the markdown schedule for the current inventory item is received is constrained by inventory at one or more of the unique clearance discounts, a first value between the minimum and maximum value of the distribution for the one or more of the unique clearance discounts may be randomly generated, a second value may be randomly generated, a number of sales of the current inventory item at the physical store may be adjusted based on the first randomly generated value when the second randomly generated value is greater than a predefined value, and the demand for the current inventory item may be determined based on the adjusted sales.

In yet further examples, to identify the past clearance item that matches the current inventory item, a past item-cluster comprised of a cluster of physical stores for the past clearance item may be identified that matches the current item-cluster based on a time of year, a stock-to sales ratio, level of inventory, pre-clearance sales, a number of stores, and/or a clearance program length. A model built based on data from the past item-cluster including actual clearance sales data for the past clearance item at the cluster of physical stores for the past clearance item may be retrieved as the second model. More than one past clearance item may be identified as matching the current inventory item, and the forecasted price sensitivity of the current inventory item may be adjusted by applying a model for each of the matched past clearance items that represents an actual price sensitivity of the respective past clearance item to the first model. The optimal markdown schedule may be determined from among the set of potential markdown schedules further based on one or more clearance goals included within the parameters of the request. The optimal markdown schedule for the current inventory item at the physical store may be updated at predetermined intervals throughout a clearance period for the current inventory item. A unique optimal markdown schedule for the current inventory item may be determined for each of a plurality of stores of a retail enterprise.

According to some examples, systems for optimizing an inventory item markdown schedule are described. An example system may a processor and a memory communicatively coupled to the processor. The memory may store instructions that, when executed by the processor, cause the system to build a model that represents a pre-clearance price sensitivity of a current inventory item at a physical store of a retailer, receive a request for a markdown schedule when the current inventory item is to be placed on clearance at the physical store, and generating a set of potential markdown schedules based on parameters of the request, each potential markdown schedule of the set defining one or more discounts and an associated discount duration. The system may be further caused to identify a past clearance item that matches the current inventory item, determine a difference between a pre-clearance price sensitivity and a clearance price sensitivity of the past clearance item, apply the difference to the model to forecast a clearance price sensitivity of the current inventory item, and determine an optimal markdown schedule from among the set of potential markdown schedules based on the forecasted clearance price sensitivity of the current inventory item.

In other examples, a grid search or a reinforcement learning technique may be implemented to determine the optimal markdown schedule from among the set of potential markdown schedules. The model may be built using a plurality of data inputs, the plurality of data inputs including one or more of price data, item sales data, inventory data, item data, store data, program metadata, and historical clearance data. The model may be comprised of a plurality of features, and upon receipt of the request, the system is further caused to generate new features using the plurality of data inputs.

In further examples, the parameters of the request may include the current inventory item that is being placed on clearance, the physical store at which the current inventory item is being placed on clearance, and one or more business rules associated with the clearance. The one or more business rules associated with the clearance may include one or more of a duration of the clearance, a timing between price discount changes, a minimum number or a maximum number of price discount changes allotted, and available values for the price discount changes.

According to some example, non-transitory computer-readable media with instructions stored thereon for optimizing an inventory item markdown schedule are described. The instructions may include building a model that represents a pre-clearance price sensitivity of a current inventory item at a physical store of a retailer, receiving a request for a markdown schedule when the current inventory item is to be placed on clearance at the physical store, and generating a set of potential markdown schedules based on parameters of the request, each potential markdown schedule of the set defining one or more discounts and an associated discount duration. The instructions may further include identifying a past clearance item that matches the current inventory item, determining a difference between a pre-clearance price sensitivity and a clearance price sensitivity of the past clearance item, applying the difference to the model to forecast a clearance price sensitivity of the current inventory item, and determining an optimal markdown schedule from among the set of potential markdown schedules based on the forecasted clearance price sensitivity of the current inventory item.

In other examples, the instructions for building the model may include enhancing price data associated with the current inventory item at the physical store and determining a demand for the current inventory item at the physical store based on the enhanced price data. The instructions for building the model may further include clustering the physical store with one or more other physical stores having stock-to-sale ratios comparable to a stock-to-sale ratio of the physical store, wherein price and demand data determined for the current inventory item at each physical store within a cluster is aggregated, and based, at least in part, on the aggregated price and demand data, estimating a price elasticity of demand of the current inventory item for the cluster, where the pre-clearance price sensitivity of the current inventory item is measured using the price elasticity of demand.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

The above specification, examples and data provide a complete description of the use of the invention. Since many embodiments of the invention can be made without departing from the spirit and scope of the invention, the invention resides in the claims hereinafter appended.

The invention claimed is:

1. A method for optimizing an inventory item markdown schedule, the method comprising:
building a first model that represents a forecasted price sensitivity of a current inventory item at a physical store of a retailer, wherein building the first model comprises:
clustering the physical store with one or more other physical stores of the retailer having stock-to-sale ratios comparable to a stock-to-sale ratio of the current inventory item at the physical store to form a current item-cluster of a plurality of physical stores;
aggregating price and demand data for the current inventory item at the plurality of physical stores; and
based on the aggregate price and demand data, generating, as the first model, a statistical model representative of forecasted price sensitivity across the plurality of physical stores;
receiving a request, from a user computing device at a markdown Application Programming Interface (API) of a markdown scheduling computing system, for a markdown schedule when the current inventory item is to be placed on clearance at the physical store, wherein the request comprises a plurality of parameters including an identification of a physical store location and a duration of clearance, and wherein the parameters are received at the API from the user computer device through an expandable menu displayed on a user interface, the expandable menu having selectable options for one or more of the plurality of parameters;
in response to receiving a selection within the expandable menu associated with the physical store location, updating the expandable menu for selecting the duration of clearance by limiting the selectable options based on the selected physical store location;
in response to receiving the request, generating a set of potential markdown schedules for the current item-cluster based on parameters of the request, each potential markdown schedule of the set defining one or more discounts and an associated discount duration for the duration of clearance;
identifying a past clearance item that matches the current inventory item, the past clearance item being different than the current inventory item and being matched to the current inventory item by matching the current item-cluster to a past item cluster for each of a plurality of past clearance items across a plurality of physical stores including the physical store, and comparing one or more of a time of year, a stock-to-sales ratio, a level of inventory, and pre-clearance sales between the current inventory item and each of the plurality of past clearance items to identify the past clearance item from among the plurality of past clearance items;
generating a set of features from the first model, including a price feature and a demand feature for the current inventory item;
based on identifying the past clearance item that matches the current inventory item, retrieving a second model that represents an actual price sensitivity of the past clearance item;
adjusting one or more of the set of features to adjust the forecasted price sensitivity of the current inventory item represented by the first model by applying the second model to the first model;
determining an optimal markdown schedule for the current item-cluster from among the set of potential markdown schedules based, at least in part, on the adjusted price sensitivity of the current inventory item;
in response to determining the optimal markdown schedule, disaggregating the optimal markdown schedule for the current item-cluster on a per-store basis; and
transmitting, via the markdown API and in response to the request, the optimal markdown schedule for the selected physical store location for the duration of clearance, to the user computing device for display via the user interface.

2. The method of claim 1, wherein building the first model further comprises:
enhancing price data associated with the current inventory item at the physical store;
determining a demand for the current inventory item at the physical store based on the enhanced price data; and
based, at least in part, on the aggregated price and demand data, estimating a price elasticity of demand of the current inventory item for the current item-cluster, wherein the forecasted price sensitivity of the current inventory item is measured using the price elasticity of demand.

3. The method of claim 2, wherein determining the optimal markdown schedule further comprises:
determining a number of units of the current inventory item for allocation to the physical store based on one or more of current inventory levels and pre-clearance demand for the current inventory item across each of the physical stores in the current item-cluster.

4. The method of claim 2, wherein enhancing the price data associated with the current inventory item at the physical store comprises:
aggregating price data for the current inventory item at the physical store with price data for the current inventory item at one or more other physical stores similar to the physical store.

5. The method of claim 2, wherein determining the demand for the current inventory item at the physical store comprises:
determining an effect of a stockout of the current inventory item on the demand; and
adjusting the demand based on the determined stockout effect.

6. The method of claim 5, wherein determining the stockout effect comprises:
based on historical clearance data, determining a subset of physical stores from a totality of physical stores of the retailer having a minimum threshold of sales;
for each physical store in the subset of physical stores, determining a percentage change of sales at one or more clearance discount percentages;
for each unique clearance discount, generating a distribution, wherein the distribution includes a minimum and maximum value representing a minimum and maximum percentage change allowed at the respective clearance discount.

7. The method of claim 6, wherein if the physical store for which the request for the markdown schedule for the current inventory item is received is constrained by inventory at one or more of the unique clearance discounts, the method further comprises:
    randomly generating a first value between the minimum and maximum value of the distribution for the one or more of the unique clearance discounts;
    randomly generating a second value;
    adjusting a number of sales of the current inventory item at the physical store based on the first randomly generated value when the second randomly generated value is greater than a predefined value; and
    determining the demand for the current inventory item based on the adjusted sales.

8. The method of claim 1, wherein more than one past clearance item is identified as matching the current inventory item, and adjusting the forecasted price sensitivity of the current inventory item comprises:
    for each of the past clearance items, applying a model that represents an actual price sensitivity of the respective past clearance item to the first model to adjust the forecasted price sensitivity of the current inventory item.

9. The method of claim 1, wherein the plurality of parameters includes one or more clearance goals, the method further comprising:
    determining the optimal markdown schedule from among the set of potential markdown schedules further based on the one or more clearance goals.

10. The method of claim 1, further comprising:
    updating the optimal markdown schedule for the current inventory item at the physical store at predetermined intervals throughout a clearance period for the current inventory item.

11. The method of claim 1, further comprising determining a unique optimal markdown schedule for the current inventory item for each of a plurality of stores of a retail enterprise.

12. The method of claim 1, wherein the set of features from the first model further includes a quality feature representative of a quality of the item.

13. The method of claim 1, further comprising disaggregating the optimal markdown schedule for the current inventory item based on demand and inventory levels for the current inventory item across the plurality of physical stores included in the current item-cluster.

14. A markdown scheduling computing system for optimizing an inventory item markdown schedule, the system comprising:
    a processor;
    a memory communicatively coupled to the processor, the memory storing instructions that, when executed by the processor, cause the system to:
        build a first model that represents a forecasted price sensitivity of a current inventory item at a physical store of a retailer, wherein building a first model comprises causing the system to:
            cluster the physical store with one or more other physical stores of the retailer having stock-to-sale ratios comparable to a stock-to-sale ratio of the current inventory item at the physical store to form a current item-cluster of a plurality of physical stores;
            aggregate price and demand data for the current inventory item at the plurality of physical stores; and
            based on the aggregate price and demand data, generate, as the first model, a statistical model representative of forecasted price sensitivity across the plurality of physical stores;
        receive a request, from a user computing device at a markdown API, for a markdown schedule when the current inventory item is to be placed on clearance at the physical store, wherein the request comprises a plurality of parameters including an identification of a physical store location and a duration of clearance, and wherein the parameters are received at the API from the user computer device through an expandable menu displayed on a user interface, the expandable menu having selectable options for one or more of the plurality of parameters;
        in response to receiving a selection within the expandable menu associated with the physical store location, updating the expandable menu for selecting the duration of clearance by limiting the selectable options based on the selected physical store location;
        in response to receiving the request, generate a set of potential markdown schedules for the current item-cluster based on parameters of the request, each potential markdown schedule of the set defining one or more discounts and an associated discount duration for the duration of clearance;
        identify a past clearance item that matches the current inventory item, the past clearance item being different than the current inventory item and being matched to the current inventory item by matching the current item-cluster to a past item cluster for each of a plurality of past clearance items across a plurality of physical stores including the physical store, and comparing one or more of a time of year, a stock-to-sales ratio, a level of inventory, and pre-clearance sales between the current inventory item and each of the plurality of past clearance items to identify the past clearance item from among the plurality of past clearance items;
        generate a set of features from the first model, including a price feature and a demand feature for the current inventory item;
        based on identifying the past clearance item that matches the current inventory item, retrieve a second model that represents an actual price sensitivity of the past clearance item;
        adjust one or more of the set of features to adjust the forecasted price sensitivity of the current inventory item represented by the first model by applying the second model to the first model;
        determine an optimal markdown schedule for the current item-cluster from among the set of potential markdown schedules based on the adjusted price sensitivity of the current inventory item;
        in response to determining the optimal markdown schedule, disaggregate the optimal markdown schedule for the current item-cluster on a per-store basis; and
        transmit, via the markdown API and in response to the request, the optimal markdown schedule for the selected physical store location for the duration of clearance, to the user computing device for display via the user interface.

15. The system of claim 14, wherein the instructions cause the system to determine the optimal markdown schedule from among the set of potential markdown schedules using one of a grid search or a reinforcement learning technique.

16. The system of claim 14, wherein the first model is built using a plurality of data inputs, the plurality of data inputs including one or more of price data, item sales data, inventory data, item data, store data, program metadata, and historical clearance data.

17. The system of claim 16, wherein the first model is comprised of a plurality of features, and upon receipt of the request, the instructions further cause the system to generate new features using the plurality of data inputs.

18. The system of claim 14, wherein the parameters of the request include one or more business rules associated with the clearance, and wherein the instructions cause the system to determine the optimal markdown schedule from among the set of potential markdown schedules further based on the one or more business rules.

19. The system of claim 18, wherein the one or more business rules associated with the clearance include one or more of, a timing between price discount changes, a minimum number or a maximum number of price discount changes allotted, and available values for the price discount changes.

20. A non-transitory computer-readable medium with instructions stored thereon for optimizing an inventory item markdown schedule, the instructions comprising:

building a first model that represents a forecasted price sensitivity of a current inventory item at a physical store of a retailer, wherein building the first model comprises:

clustering the physical store with one or more other physical stores of the retailer having stock-to-sale ratios comparable to a stock-to-sale ratio of the current inventory item at the physical store to form a current item-cluster of a plurality of physical stores;

aggregating price and demand data for the current inventory item at the plurality of physical stores; and generating, as the first model, a statistical model representative of forecasted price sensitivity across the plurality of physical stores;

receiving a request, from a user computing device at a markdown API of a markdown scheduling computing system, for a markdown schedule when the current inventory item is to be placed on clearance at the physical store, wherein the request comprises a plurality of parameters including an identification of a physical store location and a duration of clearance, and wherein the parameters are received at the API from the user computer device through an expandable menu displayed on a user interface, the expandable menu having selectable options for one or more of the plurality of parameters;

in response to receiving a selection within the expandable menu associated with the physical store location, updating the expandable menu for selecting the duration of clearance by limiting the selectable options based on the selected physical store location;

in response to receiving the request, generating a set of potential markdown schedules for the current item-cluster based on parameters of the request, each potential markdown schedule of the set defining one or more discounts and an associated discount duration for the duration of clearance;

identifying a past clearance item that matches the current inventory item, the past clearance item being different than the current inventory item and being matched to the current inventory item by matching the current item-cluster to a past item cluster for each of a plurality of past clearance items across a plurality of physical stores including the physical store, and comparing one or more of a time of year, a stock-to-sales ratio, a level of inventory, and pre-clearance sales between the current inventory item and each of the plurality of past clearance items to identify the past clearance item from among the plurality of past clearance items;

generating a set of features from the first model, including a price feature and a demand feature for the current inventory item;

based on identifying the past clearance item that matches the current inventory item, retrieving a second model that represents an actual price sensitivity of the past clearance item;

adjusting one or more of the set of features to adjust the forecasted price sensitivity of the current inventory item represented by the first model by applying the second model to the first model;

determining an optimal markdown schedule for the current item-cluster from among the set of potential markdown schedules based on the adjusted price sensitivity of the current inventory item;

in response to determining the optimal markdown schedule, disaggregating the optimal markdown schedule for the current item-cluster on a per-store basis; and transmitting, via the markdown API and in response to the request, the optimal markdown schedule for the selected physical store location for the duration of clearance, to the user computing device for display via the user interface.

21. The non-transitory computer-readable medium of claim 20, where the instructions for building the first model further comprise:

enhancing price data associated with the current inventory item at the physical store;

determining a demand for the current inventory item at the physical store based on the enhanced price data; and based, at least in part, on the aggregated price and demand data, estimating a price elasticity of demand of the current inventory item for the current item-cluster, wherein the forecasted price sensitivity of the current inventory item is measured using the price elasticity of demand.

\* \* \* \* \*